United States Patent
Agesen

(10) Patent No.: US 10,545,744 B2
(45) Date of Patent: *Jan. 28, 2020

(54) PREDICTION MECHANISM FOR SUBROUTINE RETURNS IN BINARY TRANSLATION SUB-SYSTEMS OF COMPUTERS

(71) Applicant: VMware, Inc., Palo Alto, CA (US)

(72) Inventor: Ole Agesen, Menlo Park, CA (US)

(73) Assignee: VMware, Inc., Palo Ato, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/806,288

(22) Filed: Nov. 7, 2017

(65) Prior Publication Data

US 2018/0189041 A1   Jul. 5, 2018

Related U.S. Application Data

(63) Continuation of application No. 12/485,679, filed on Jun. 16, 2009, now Pat. No. 9,836,292, which is a continuation of application No. 11/862,030, filed on Sep. 26, 2007, now Pat. No. 7,555,747, which is a
(Continued)

(51) Int. Cl.
   *G06F 8/52*    (2018.01)
   *G06F 9/30*    (2018.01)

(52) U.S. Cl.
   CPC .............. *G06F 8/52* (2013.01); *G06F 9/3017* (2013.01)

(58) Field of Classification Search
   CPC .................................. G06F 8/52; G06F 9/2017
   See application file for complete search history.

(56) References Cited

U.S. PATENT DOCUMENTS

| 5,038,281 A | 8/1991 | Peters |
| 5,333,296 A | 7/1994 | Bouchard et al. |
| 5,574,873 A | 11/1996 | Davidian |

(Continued)

OTHER PUBLICATIONS

Chernoff et al., FX!32 A Profile-Directed Binary Translator, published by IEEE Micro, 1998, pp. 56-64, [Retrieved online Sep. 25, 2018 from ftp://ftp.cis.upenn.edu/pub/cis700-6/public_html/04f/papers/chernoff-fx32.pdf] (Year: 1998).*

(Continued)

*Primary Examiner* — S. Sough
*Assistant Examiner* — Zheng Wei
(74) *Attorney, Agent, or Firm* — Patterson + Sheridan, LLP

(57) ABSTRACT

A sequence of input language (IL) instructions of a guest system is converted, for example by binary translation, into a corresponding sequence of output language (OL) instructions of a host system, which executes the OL instructions. In order to determine the return address after any IL call to a subroutine at a target entry address P, the corresponding OL return address is stored in an array at a location determined by an index calculated as a function of P. After completion of execution of the OL translation of the IL subroutine, execution is transferred to the address stored in the array at the location where the OL return address was previously stored. A confirm instruction block is included in each OL call site to determine whether the transfer was to the correct or incorrect call site, and a back-up routine is included to handle the cases of incorrect call sites.

18 Claims, 3 Drawing Sheets

Related U.S. Application Data continuation of application No. 10/676,998, filed on Sep. 30, 2003, now Pat. No. 7,290,253.

(56) References Cited

U.S. PATENT DOCUMENTS

| | | | |
|---|---|---|---|
| 5,606,682 A | 2/1997 | McGarity | |
| 5,623,617 A | 4/1997 | Davidian | |
| 5,680,622 A | 10/1997 | Even | |
| 5,732,272 A * | 3/1998 | Gochee | G06F 11/3419 717/128 |
| 5,752,069 A | 5/1998 | Roberts et al. | |
| 5,758,140 A | 5/1998 | Kahle et al. | |
| 5,764,946 A | 6/1998 | Tran et al. | |
| 5,847,954 A | 12/1998 | Beard et al. | |
| 5,848,423 A | 12/1998 | Ebrahim et al. | |
| 5,860,104 A | 1/1999 | Witt et al. | |
| 5,864,707 A | 1/1999 | Tran et al. | |
| 5,881,278 A | 3/1999 | Tran et al. | |
| 5,887,152 A | 3/1999 | Tran | |
| 5,905,999 A * | 5/1999 | Liu | G06F 12/0862 711/151 |
| 5,968,169 A | 10/1999 | Pickett | |
| 6,012,149 A | 1/2000 | Stavran | |
| 6,014,734 A | 1/2000 | Tran et al. | |
| 6,049,866 A | 4/2000 | Earl | |
| 6,076,151 A * | 6/2000 | Meier | G06F 9/383 707/999.202 |
| 6,079,003 A | 6/2000 | Witt et al. | |
| 6,079,005 A | 6/2000 | Witt et al. | |
| 6,079,006 A * | 6/2000 | Pickett | G06F 9/3802 711/213 |
| 6,079,066 A | 6/2000 | Backlund | |
| 6,098,157 A | 8/2000 | Hsu et al. | |
| 6,266,752 B1 | 7/2001 | Witt et al. | |
| 6,269,436 B1 | 7/2001 | Tran et al. | |
| 6,321,330 B1 * | 11/2001 | Doshi | G06F 9/30072 711/213 |
| 6,470,435 B2 | 10/2002 | Samra et al. | |
| 6,519,768 B1 | 2/2003 | Hughes et al. | |
| 6,604,190 B1 | 8/2003 | Tran | |
| 6,604,191 B1 | 8/2003 | Flacks et al. | |
| 6,684,298 B1 * | 1/2004 | Dwarkadas | G06F 12/0864 711/128 |
| 6,711,672 B1 * | 3/2004 | Agesen | G06F 8/52 712/227 |
| 6,751,583 B1 | 6/2004 | Clarke et al. | |
| 6,934,832 B1 | 8/2005 | Van Dyke et al. | |
| 7,047,394 B1 | 5/2006 | Van Dyke et al. | |
| 7,107,580 B2 * | 9/2006 | Zemach | G06F 8/52 717/136 |
| 7,203,944 B1 * | 4/2007 | van Rietschote | G06F 9/45533 718/1 |
| 7,213,246 B1 * | 5/2007 | van Rietschote | G06F 11/1482 707/999.202 |
| 7,243,193 B2 | 7/2007 | Walmsley | |
| 7,251,811 B2 * | 7/2007 | Rosner | G06F 8/52 703/27 |
| 7,266,637 B1 * | 9/2007 | van Rietschote | G06F 3/0607 711/112 |
| 7,533,229 B1 * | 5/2009 | van Rietschote | G06F 11/1438 711/161 |
| 7,603,670 B1 * | 10/2009 | van Rietschote | G06F 9/4856 718/1 |
| 7,779,020 B2 * | 8/2010 | Grust | A61K 9/0075 707/760 |
| 8,024,506 B1 * | 9/2011 | Agesen | G06F 12/1036 711/132 |
| 8,423,976 B2 * | 4/2013 | Zwirner | G06F 8/52 717/136 |
| 8,776,050 B2 * | 7/2014 | Plouffe | G06F 9/45537 718/1 |
| 9,665,374 B2 * | 5/2017 | Yamada | G06F 9/3806 |
| 2002/0082824 A1 * | 6/2002 | Neiger | G06F 9/45537 704/2 |
| 2002/0092002 A1 | 7/2002 | Babaian et al. | |
| 2004/0093521 A1 | 5/2004 | Hamadeh et al. | |
| 2005/0149739 A1 | 7/2005 | Hopkins et al. | |

OTHER PUBLICATIONS

Palmer et al., SIND: A framework for binary translation. Tech. Rep. TR-CS-2001-38, University of New Mexico, pp. 1-12 (Year: 2001).*
Zheng et al., PA-RISC to IA-64: transparent execution, no recompilation, published by IEEE, pp. 47-52 (Year: 2000).*
Ian A. Rogers, Optimising Java Programs Through Basic Block Dynamic Compilation, pp. 1-175, [Retrieved online on Sep. 24, 2018 from http://apt.cs.manchester.ac.uk/ftp/pub/apt/theses/IanRogers_PhD.pdf] (Year: 2002).*
Cifuentes et al., The Design of a Resourcable and Retargetable Binary Translator, published by IEEE CS, Proceedings of the Sixth Working Conference on Reverse Engineering, Atlanta, USA, Oct. 1999, pp. 280-291 (Year: 1999).*
Cramer et al., Compiling Java Just in Time, published by IEEE Micro, pp. 36-43 (Year: 1997).*
Ebcioglu et al., "DAISY: Dynamic Compilation for 100% Architectural Compatibility," published by 24th Annual International Symposium on Computer Architecture Denver, Colorado, Jun. 1997, pp. 26-37 (Year: 1997).*
Sites et al., Binary Translation, published by Communications of the ACM, 36(2), Feb. 1993, pp. 1-16 (Year: 1993).*
Kim et al. "Dynamic Binary Translation for Accumulator-Oriented Architecture", Mar. 2003, Proceedings of the International Symposium on Code Generation and Optimization, 2003.
Hookway et al. "Digital FX!32: Combining Emulation and Binary Translation", 1997, Digital Technical Journal, vol. 9, No. 1.
Kaeli et al., "Branch History Table Prediction of Moving Target Branches Due to Subroutine Returns", ACM, 1991, pp. 34-42.
Skadron et al., "Improving Prediction for Procedure Returns with Return-Address-Stack Repair Mechanisms", IEEE, 1998, pp. 259-271.
Meyer et al., "JAVA Virtual Machine", O'Reilly and Associates, 1997, Chapter 9, (18 pages).
Ole Agesen, "Binary Translation of Returns", ASPLOS XII, 2006, pp. 1-8 <http://www.princeton.edu/-asplos06/>.

* cited by examiner

PREDICTION MECHANISM FOR SUBROUTINE RETURNS IN BINARY TRANSLATION SUB-SYSTEMS OF COMPUTERS

CROSS-REFERENCE TO RELATED APPLICATIONS

This patent application is a continuation of U.S. patent application Ser. No. 12/485,679, filed on Jun. 16, 2009, now U.S. Pat. No. 9,836,292, issued Dec. 5, 2017, which is a continuation of U.S. patent application Ser. No. 11/862,030, filed on Sep. 26, 2007, now U.S. Pat. No. 7,555,747 issued on Jun. 30, 2009, which claims priority to U.S. patent application Ser. No. 10/676,998, filed on Sep. 30, 2003, now U.S. Pat. No. 7,290,253 issued on Oct. 30, 2007, the entire content incorporated herein by reference.

This patent application is related to U.S. Pat. No. 6,711,672, which was granted to Ole Agesen on Mar. 23, 2004, and which is incorporated herein by reference.

BACKGROUND

Field of the Invention

This invention relates to computer programs in general, and in particular, to a method and related system for implementing subroutine calls and returns especially in the context of a virtualized computer running on a host.

Description of the Related Art

It is a well known fact that software constitutes a large fraction of the cost of computer systems. On the surface, this may seem surprising since, once developed, software can be installed and replicated without limit. The cost, however, stems from the difficulty of initial development, and the need for ongoing maintenance in the form of customization, defect elimination, and development of upgrade versions over the lifetime of the software. To give an indication of the magnitude of software engineering costs, consider that writing what is now considered a medium-sized software package may require hundreds of man-years of investment initially; moreover, following the first deployment, ongoing maintenance may demand comparable resources.

One of the hardest challenges in software engineering, be it initial development or subsequent maintenance, is the management of complexity. In particular, preventing a change or addition to one part of a system from having unforeseen and undesirable consequences in another part of the system can require significant effort. Consider, for example, that a large software system may contain millions of lines of program code, any one of which could potentially interact with any other, and it may be seen that the potential for errors is quite large. This is particularly true since no individual could write all the code, nor could any individual be familiar with all of it, once written. Early on, software developers and researchers recognized that in order to work effectively in such environments where individuals have only partial knowledge of the full system, systematic development techniques must be followed.

Perhaps the most widely employed development technique involves the decomposition of software into subroutines, also known as subprograms, functions, procedures, or methods. A subroutine comprises a number of program statements and optional data structures to perform a given task. The subroutine logically encapsulates the individual statements, allowing them to be invoked ("called") as a group from elsewhere in the program. The effect of the subroutine invocation is to execute the statements encapsulated in the subroutine. When the last such statement completes, execution returns to the point in the program where the subroutine was invoked.

With subroutines, then, instead of solving a top-level problem directly, programmers partition it into a number of smaller problems, such that a solution to the top-level problem can be obtained by combining solutions to the smaller problems: Each smaller problem's solution is encapsulated into a subroutine, enabling the large problem's solution to be expressed as a sequence of subroutine invocations. Often, but not necessarily, the decomposition follows a hierarchical pattern in which higher-level subroutines are implemented in terms of lower-level subroutines, which in turn are implemented from even lower-level subroutines, until the point where the problems have been partitioned sufficiently that solutions can be expressed directly using primitive statements from the programming language.

The use of subroutines provides multiple advantages in software development. First, complexity is reduced locally: The number of logical steps required to solve a given problem can be kept small because the solution can be expressed in terms of higher-level operations implemented in subroutines instead of in terms of the low-level primitives defined directly by the programming language. Second, complexity is reduced globally: Because subroutines encapsulate groups of statements, programmers can often reason about the interaction of subroutines rather than the interaction of individual statements across the program. Without this encapsulation, it would be very difficult to implement large-scale software systems. Third, subroutines allow for code reuse: Once a solution to a sub-problem has been implemented and made available as a subroutine, it can be used as a building block for solving many different problems; this greatly reduces the time required to implement software, since it is not necessary to start from scratch each time. It also reduces the size of programs, since general-purpose subroutines need only be provided once even though they are used in multiple places.

For all of these reasons, and more, the use of subroutines has become fundamental to software engineering. As a result, during execution of programs written in this manner, computers will execute a large number of subroutine calls and returns.

Consider now how subroutines may be implemented on contemporary computers. In other words, consider programming language implementation.

Most of the time, programmers write software in high-level programming languages such as Cobol, Fortran, Modula-2, C, C++, or Java. All of these languages provide subroutines in some form. While the details vary in terms of both syntax and semantics (especially with respect to parameter passing), many similarities remain. In particular, all these languages provide a "last-in, first-out" (LIFO) ordering on subroutine calls and returns: the last subroutine to have been called will be the first one to return. For example, let A, B, and C denote subroutines and suppose that A calls B, and B calls C. If a "return-from-subroutine" statement is executed, it will terminate the execution of subroutine C (the one called most recently) and execution will continue in subroutine B at the point that immediately follows the invocation of C. Later, a return statement in B may terminate B's invocation and take execution back to subroutine A.

Because subroutine execution respects this LIFO order, an efficient implementation can be realized by using a push-down stack. With this well known implementation technique, a subroutine invocation, such as A calling B, is performed in two steps. First, the return address is pushed onto the stack. Second, the program counter is updated to indicate the first statement of subroutine B, that is, execution "jumps" to the beginning of B. The execution of B now proceeds without regard to where it was invoked from. Eventually, a return statement in B will be encountered or, equivalently, the last statement in B will complete. In either case, to return back to its caller, subroutine B need only perform a single step: it pops the top-most item from the stack, which will be the address to which it should return, and places this value in the program counter register. Now, instruction fetching and execution will continue from the point in the caller (A in the example) that follows the call to B.

The use of a stack provides a high degree of generality. A subroutine, such as B, can correctly return back to its caller A, even if B, during its execution, performs further subroutine invocations. For instance, if A calls B, then the stack will contain "A" when the execution of B commences. Now, if B later calls C, then the stack will contain two return addresses "A; B" where B is the most recent (top-most) item. When C returns, it will pop the topmost item from the stack (B) leaving just "A" on the stack. This is the same state as before the call of C in B, so following the invocation and completion of subroutine C, B can execute to completion and return back to A by popping the return address from the stack in the usual manner. (Merely for the sake of notational simplicity, one may equate return addresses with the caller subroutine; in actual implementations, the return addresses must indicate the precise statement within the caller to which execution should return. Often, but not necessarily, this return address will be represented as a memory address.)

The stack implementation of subroutine calls and returns also allows a subroutine to invoke itself. This ability leads to a powerful programming technique known as recursion, and makes possible elegant solutions to a number of problems. During recursive subroutine invocations, the stack will contain a repeated sequence of return addresses " . . . A; A; . . . ; A", but more general patterns involving mutual recursion between two or more different subroutines can also be handled in the stack implementation of calls and returns.

Fundamental to many programming languages and uses of subroutines are the concepts of local state and parameters. Because these concepts are well understood in the art, they are discussed only briefly here. Most subroutines make use of local variables for carrying out their computations. In many implementations, it is desirable to allocate storage for local variables on the same stack that holds the return addresses. The stack allocation provides two advantages. First, storage is only committed to a subroutine's variables when the subroutine is active. Second, recursive subroutines can have multiple instances of these variables (one per invocation), thereby preventing awkward interference that would result if recursive invocations were to share the local variables. In addition to supporting local variables, subroutine invocation mechanisms will often also provide some way to pass parameters from the caller to the called subroutine. Simplifying slightly, one may think of these parameters as a form of local variables that are initialized by the caller.

It is common to handle all these facets of subroutine invocation by using the concept of activation records (frames). An activation record is a consecutive range of storage on the stack. The activation record contains fields for the return address, the parameters and the local variables. Each subroutine invocation will push one activation record on the stack, and each subroutine return will pop one activation from the stack. Activation records appear and disappear in the same LIFO order as subroutine invocations begin and end.

Without loss of generality, and for the sake of clarity, one may think of and refer to subroutine invocations as pushing and popping simple program counters rather than full activation records. This convention is followed below.

Non-stack-based techniques also exist for implementing subroutine calls, but they have limitations that make them less desirable than the stack approach, except when special circumstances call for their use. In one alternative technique, for example, the caller subroutine writes the return address into a known location that is associated with the called subroutine. The called subroutine then performs a return by setting the program counter to the value found in that known location. Since there is only one such location per subroutine, recursion cannot be supported. In another alternative, subroutine invocations construct a linked list of activation records in an object heap. In this case, recursion can be supported, but the costs of heap-allocating and reclaiming the activation records tend to be higher than the costs of using a stack. Unless there are other compelling reasons for using heap allocation, the stack approach is therefore usually considered to be superior.

Because the stack implementation offers significant advantages, it has found widespread use. In turn, and because of this frequent use, most modern CPU's implement direct support for stack-based calls and returns in their machine-code language. These low-level (hardware) call and return instructions are designed to facilitate translation of high-level programming language subroutine invocations and returns into their low-level counterparts. While the hardware instructions do not implement the full semantics of subroutine invocations as found in many high-level languages and the translation therefore requires the use of additional instructions (for example, for passing parameters), the hardware support for calls and returns nonetheless ensures that subroutine invocations can be implemented very efficiently. Indeed, programmers have come to rely on efficient subroutine mechanisms, thereby completing the feedback cycle from programming style to hardware design and back to programming style.

There are certain situations, however, in which hardware call and return instructions cannot easily, if at all, be used directly to implement subroutine calls and returns. One such situation arises in the context of binary translation.

To understand binary translation, one must distinguish between programs in "source" form, as opposed to "binary" form. The source is the representation that programmers create, modify and extend. Binary programs, on the other hand, result from translation of source into a form optimized for execution. Usually, the binary form is densely encoded and non-textual (from which it derives its name), comprising bit-patterns that represent machine instructions. Besides the textual versus non-textual representation difference, symbolic names in source code may be replaced by absolute memory addresses in binary code, comments found in source code may be absent from binary code, and other information that is inessential for execution may be removed. The process by which binary code is obtained from source code is usually fully automatic and is known as compilation for high-level source languages and assembly for low-level machine code source languages (assembler languages).

Consider now what would happen if the need were to arise to execute a given program on a platform different from the one for which it was originally developed. There may be several reasons why this could happen, for example, the original platform may no longer be available or economically attractive. Ordinarily, the program would need to be "ported" to the new platform. For programs written directly in the machine code of the original platform, porting may entail an almost complete rewrite of the program since the source program may be intimately tied to the original platform. Thus, the porting effort may be substantial and costly.

The situation is somewhat better for programs written in a high-level language and subsequently compiled into binary form. Often, in this case, the bulk of the source code needs only a few modifications before it can be recompiled for the new platform. On the other hand, recompilation rarely accomplishes 100% of the porting task; several things can get in the way.

Most programs depend on other software, including systems software, for performing basic tasks like file input and output, or application software libraries such as graphical user interfaces. Sometimes, these libraries are unavailable on the new platform and thus require the porting effort to extend beyond the core piece of software. In other cases, parts of the source code for the original application may have been lost, or over time may have become outdated as problems were corrected and extensions added to the software by "patching" the binary program. In yet other cases, no compiler may be available on the new platform for the source programming language. The porting effort, then, must include a source-to-source transformation, the porting of a compiler for the programming language, or a rewrite of the program. Thus, it may be appreciated that, in many cases, the costs of porting a program from one platform to another may be substantial, even if secondary effects such as the need to retest and validate the software on the new platform are ignored.

In this situation, binary translation may be an attractive alternative to program-for-program porting. In a binary translation system, a piece of controlling software, namely, the binary translator, is placed between the hardware of the new platform and the binary of the program for the old platform. Stated simply, the binary translator will translate an old-platform binary program instruction-by-instruction into equivalent instructions for the new platform, in some implementations also interleaving the translation process with the execution of the resulting new-platform instructions. At the loss of some efficiency due to the binary translation process, this provides the general ability to execute old-platform binaries in an unmodified (and unported) form on the new platform.

Research prototypes as well as commercially available binary translators have been built for a number of systems, including the FX!32 translator from Compaq/DEC, which allows execution of Intel x86 binaries on an Alpha processor, and the MAE system, which allows execution of Macintosh programs on Solaris/SPARC platforms. Binary translation has also been used to allow older Macintosh 68K programs to execute on newer PowerPC Macintosh computers. Perhaps the most common use of binary translation is found in high-performance Java virtual machines, which translate Java byte-code into instructions that can be executed directly by the underlying hardware. Representative articles describing binary translation include:

"The Design of a Resourcable and Retargetable Binary Translator," Cristina Cifuentes, Mike Van Emmerik, Norman Ramsey, Proceedings of the Sixth Working Conference on Reverse Engineering, Atlanta, USA, October 1999, IEEE-CS Press, pp. 280-291;

"Compiling Java Just in Time," Timothy Cramer, Richard Friedman, Terrence Miller, David Seberger, Robert Wilson, and Mario Wolczko, IEEE Micro, May/June 1997;

"DAISY: Dynamic Compilation for 100% Architectural Compatibility," Kemal Ebcioglu and Erik R. Altman, 24th Annual International Symposium on Computer Architecture Denver, Colo., June 1997, pp. 26-37; and "Binary Translation," Richard L. Sites, Anton Chernoff, Matthew B. Kirk, Maurice P. Marks, and Scott G. Robinson, Communications of the ACM, 36(2), February 1993.

Binary translation offers valuable capabilities even when employed within a single hardware platform, that is, when the input and output instruction set of the binary translator are identical.

Different binary translators may offer a variety of capabilities and make different assumptions about the input binary programs. For example, one class of binary translators, to which the aforementioned FX!32 and the Java translators belong, assume that the code being translated is at "user level," containing only code that executes in a restricted mode on the CPU and adhering to the (binary) application program interfaces (API's) defined by the combination of the hardware and operating systems of the platform. Other binary translators, such as HP's Dynamo optimizing binary translator, make the further assumption that programs use no reflective operations, ruling out actions such as explicitly accessing or manipulating the return address entries on the stack by means other than performing subroutine invocations and returns.

Essentially, the more assumptions the binary translator makes, the fewer restrictions remain on how the binary program can be transformed in the translation step, allowing for higher performance. In an ideal world, assumptions would be unnecessary, and analysis could extract facts about the program being processed, thereby allowing maximal efficiency within the constraints set by the behavior of each program. The present state of the art in binary code analysis, however, provides only limited capabilities and often incurs considerable analysis costs. Thus, the differentiation between binary translators that make fewer versus more assumptions is justified, at least for the time being.

Binary translators that make no assumptions about the behavior of the translated program may be termed "unrestricted." Such unrestricted translators generally need to fully preserve the illusion that the binary program is executing on the original platform, despite the fact that binary translation is being used. When no assumptions about the behavior of the program are made, this generally requires that the binary translator should faithfully preserve all data structures in memory as they would have appeared, had the program been executing on the original platform.

Consider an unrestricted binary translator that processes a sequence of instructions in an input binary language (IL) generated by a guest system into a corresponding sequence of instructions in the output binary language (OL) of a host system. For example, the IL might be the instruction set specified by the SPARC v9 architecture (see "The SPARC Architecture Manual," David L. Weaver, Tom Germond (Eds.), PTR Prentice Hall, Englewood Cliffs, N.J., 1994), and the OL might be the instruction set specified by the Intel Pentium architecture, commonly referred to as "x86" (see "Pentium Pro Family Developer's Manual," Volume 1-3. Intel Corporation, 1996).

Note that it is also possible, although not essential to this invention, for the IL and OL to be the same language. In other words, the IL and OL may express the same or substantially the same instruction set; moreover, either the IL or OL might be a subset of the other. For the sake of clarity and to minimize the notational burden, without loss of generality, it is assumed in the following discussion that IL and OL both refer to x86-like languages. While actual computer systems may provide instruction sets that differ in some ways, the semantics used below for IL and OL call and return instructions are representative of almost all modern instruction set architectures (ISAs); those skilled in the art will easily be able to apply the teachings of the various aspects of the invention to any given IL and OL.

Now recall the effect and possible translations of call and return instructions in the IL language. The most common form of call instruction is shown in Table 1, wherein text after a semicolon ";" is a comment:

TABLE 1

| call P | ;call the subroutine that begins at address P |
| R: <some IL instruction> | ;instruction following call is at address R. This is the instruction to be executed after return from the call to P |

When executed, this call instruction will (1) push the address R of the following instruction onto the stack, and (2) Set the program counter (PC), which on x86 platforms is named %eip, to the address P.

FIG. 1 illustrates the contents of the stack before this call. FIG. 2 illustrates the contents of the stack after execution of the call instruction. In the x86 instruction set, "%esp" designates the top-of-stack pointer register and stacks grow from higher toward lower addresses.

In other words, in the x86 ISA, the effect of the call instruction is to push the return address R onto the stack. Now the subroutine at address P executes, possibly making use of the stack to hold temporary data or make further calls, that is, possibly pushing additional items onto the stack (but ordinarily never allowing the top of the stack to recede back over the cell containing "R"). By the time that the subroutine at P has completed and is ready to return, the stack must have returned to the state shown in FIG. 2. To return, the subroutine P executes a return instruction as shown below in Table 2. This will pop the topmost element from the stack into the program counter %eip, that is, it will set %eip equal to R and update %esp so that the stack becomes as illustrated in FIG. 3.

TABLE 2

| ret | ;return to the caller of this subroutine |

An unrestricted binary translator will generally have to translate an IL-call instruction into a sequence of OL-instructions that have the same effect on the stack as the IL-call would have had, had it executed directly on the IL platform. For example, the call may be translated as shown in Table 3:

TABLE 3

| Input Language (IL) | Output Language (OL) |
|---|---|
| call P → | push R |
| R: | jmp P' |

This translation of the call is very efficient: It causes only a minimal slow-down (two OL instructions versus one IL instruction) and faithfully preserves all IL state. In this and the following examples, the arrow denotes translation of an IL instruction into one or more OL instructions. Single quotes (') are used to indicate addresses in the output (translated) domain. In the example above, the subroutine at address P in the IL domain has been translated into OL instructions that are placed at address P'.

In general, unrestricted binary translators must assume that the program being translated may inspect its own code, so the translator places the OL code at a different address than the IL code in order to keep the IL code accessible and unchanged. One way to ensure this is for the binary translator to store the OL instructions in a translation cache located in an area of memory isolated from, for example, beyond the addressable memory limits of, the original program. Moreover, OL-instruction sequences may be longer than IL-sequences, so even if no self-inspection takes place, lack of space may rule out placing OL instructions at the original IL addresses.

Note that to faithfully preserve all state in memory, including the stack, the translated instructions must push the untranslated return address "R" onto the stack: Before returning from the subroutine call, the IL program might execute instructions to inspect the value at the top of the stack. Since this stack location would contain the return address R absent binary translation, it must also contain R even with binary translation.

Consider now the translation of a return. A return has two effects: First, it sets the program counter %eip to the value at the top of the stack and it pops this value by updating the stack pointer so that it points to the next higher (or lower, as the case may be) address on the

TABLE 4

| ret → | save scratch registers %eax, %ebx, %flags |
| | pop %eax ;pop IL return address |
| | %eax := ILToOLAddress(%eax) |
| | store (Return_Target), %eax |
| | restore scratch registers %eax, %ebx, %flags |
| | jmp (Return_Target) | stack. In other words, %esp:=%esp+1. In the case of the x86 architecture, in which each word is four bytes long, the actual instruction would be %esp:=%esp+4. Incrementing by one is assumed in this discussion merely for the sake of simplicity. The actual amount by which the stack pointer is incremented (or, equivalently, decremented, depending on the architecture) will of course depend on the architecture for which the invention is implemented. The second effect (updating %esp) can be easily achieved in the translated domain OL.

Achieving the first effect is, however, harder, because it is necessary to set the machine's program counter to the translated return address R'. But the top of the stack, by the above translation of the call, does not contain R', but rather R. If the system were to set %eip to R, then execution would incorrectly proceed to execute untranslated IL code after the return. The code produced by the translator for returns must therefore map the IL return address found on the top of the stack to an OL return address. This requires a translation of returns of the schematic form shown in Table 4:

Here, "ILToOLAddress( )" is a place-holder for an OL instruction sequence that maps an IL address to an OL translated address. This instruction sequence can be long. In order to perform the mapping efficiently, one or more registers may be required. Before registers can be used, however, their current contents must be saved to memory so that after the temporary needs of the return translation have been fulfilled, the registers can be restored to the values that the binary program expects. To illustrate, assume that two registers, %eax and %ebx, and the processor status register, %flags, will be used by the return translation sequence. Mathematically, the mapping from IL to OL addresses can be represented as a set of IL/OL address pairs, with the further property that there is at most one OL address associated with any given IL address. To map an IL address to an OL address, the system locates the unique pair whose first component is the IL address in the pair; the sought OL address is then the second component of that pair.

Standard techniques for implementing mappings from one set of values (for example, IL addresses) to another set of values (for example, OL addresses), use data structures such as hash tables, binary trees, or—for small mappings—flat arrays searched linearly. The problem with all these data structures is that even though they are optimized, they are still relatively slow when used in the translation of return instructions: A single IL return instruction is converted into a sequence of OL instructions that, among other things, perform the mapping from IL to OL addresses. Because of this expansion, whereas the original IL return may execute in just a handful of CPU cycles, the OL sequence could require dozens of cycles. Moreover, since subroutine calls and returns are very frequent, the result is a noticeable slowdown when programs execute in a binary translation system.

Other techniques for implementing control-flow changes, including returns, involve variations of a technique known as inline caching, which was first introduced by Deutsch and Shiffman in "Efficient Implementation of the Smalltalk-80 System," Conference Record of the Eleventh Annual ACM Symposium on Principles of Programming Languages, pp. 297-302, Salt Lake City, Utah, 1984. According to these techniques, at the control-flow transfer site (for example, at the site of a translated return), the last translated target to which the transfer went is cached. When sufficient locality exists, such that transfers repeatedly go to the same target (or targets), these inline caches can yield very high performance.

Empirical studies have indicated, however, that these techniques are prone to high miss rates when employed for returns, at least for some code. When the miss rates become too high, performance will be dominated by the slower backup strategies that handle misses, which potentially cause more performance to be lost in the "miss" cases than were gained over the conventional solution in the "hit" cases. For example, inline caches will tend to miss when multiple callers alternate to call a subroutine, because every return would be transferring back to a different target than the previous time.

Instead of an inline cache, some systems use a hash table to return from subroutine calls. A significant drawback of this solution is that the code sequence needed to probe the table is often even longer than the code sequence required to deal with inline caching.

Yet another prior art technique involves using a second stack separate from the primary stack introduced above. To avoid confusion, one may refer to this second stack as the "shadow" stack. Commonly, shadow stacks have been employed in hardware, where they are often denoted by names like "on-chip" return stacks. In principle, however, they can also be implemented in software, which is the form described here.

A shadow stack is stored in a memory area separate from the primary stack and has its own stack pointer. The shadow stack may be of smaller capacity than the primary stack, in which case it will occasionally be unable to provide assistance when returning. When used in binary translation, the shadow stack is hidden from the program being executed using binary translation. Similarly, in hardware designs, the "on-chip" return stack is often non-architected state, meaning that there are no instructions to manipulate it directly.

Using a shadow stack, one may translate a call into the schematic sequence shown in Table 5.

TABLE 5 push IL return address R on primary stack
push OL return address R' on shadow stack
jump to entry point of the translated subroutine Returns may be translated into the schematic sequence shown in Table 6.

TABLE 6 pop IL return address R from the primary stack
pop OL return address R' from the shadow stack
verify that the IL and OL items "match", that is, that the R' popped from the
   shadow stack corresponds to the R popped from the primary stack;
jump to the OL return address R' obtained in the second step The underlying assumption here is that testing whether IL and OL addresses correspond to each other can be done faster than computing one (OL) from the other (IL). One way to support fast verification of the correspondence between R and R' is to push both R (IL) and R' (OL) onto the shadow stack as a pair. Because stack operations are fast, this is an efficient way to ensure that the "correct" IL/OL pairings are available to the system. The schematic instruction sequence shown in Table 7 can be used to accomplish this:

TABLE 7 push IL return address R on primary stack
push OL return address R' on shadow stack
push R on the shadow stack
jump to entry point of the translated subroutine Returns may be translated to the sequence of Table 8:

TABLE 8 pop IL return address R from the primary stack
pop X from the shadow stack
pop X' from the shadow stack
verify that X=R and
   if so, then jump to X', which will be the correct R'
   if not, then map the IL return address R to the correct OL
   address and
      jump to the OL address R'

The shadow stack scheme is particularly attractive in hardware because the shadow stack push and pop operations in the call and return sequences can run in parallel with the push and pop sequences on the regular stack. As a software technique, shadow stacks have certain disadvantages. For example, the cost of pushing items onto the shadow stack (in the call sequence) and popping items from the shadow stack (in the return sequence) can be substantial. It is usually not possible to dedicate a processor register to hold the shadow stack pointer, so this stack pointer frequently will be loaded from memory and saved back to memory. Moreover, boundary checks to prevent shadow stack overflow or underflow may also add costs.

U.S. Pat. No. 6,711,672, "Method and System for Implementing Subroutine Calls and Returns in Binary Translation Sub-systems of Computers," (the '672 patent) filed 22 Sep. 2000 by the inventor of the present application, discloses an improvement on the existing techniques described above and avoids many of their drawbacks.

Central to the scheme in the '672 patent is a data structure—for example, an array of 64 cells—that makes up a return target cache (RTC). The contents of the return target cache array are OL return addresses; hashed IL return addresses are used to compute an index into the RTC. The translated code for a call stores a value into rtc[ ] as a "hint" to help the return launch block "find" the right target. Expressed in typical opcode (pseudo-assembly code) form, a typical call to a procedure P, where the call's return address is R, is translated as shown below in Table 9 in the scheme described in the '672 patent. As before, P' denotes the OL address corresponding to the IL address P. The expression R & 63 represents the bitwise AND of R and 63 and operates as a hash function. Because R is a compile-time constant when translating the call, the expression R & 63 can also be evaluated at compile time.

TABLE 9

| Input Language (IL) | Output Language (OL) |
|---|---|
| call P → | push R |
| R: | rtc[R & 63 ] := R' |
|  | jump P' |

In the system described in the '672 patent, the launch block (instruction sequence) that would be executed whenever a return instruction is encountered, expressed in x86 instructions, would be as shown below in Table 10, where rtc_Base is the base address of the RTC (see FIG. 5) and the constant c is a scale factor applied to account for the array elements being more than one byte apart in address. Such address scaling is well understood in the art of translating higher level language constructs such as arrays (for example, rtc[R & 63]:=R') into machine instructions.

TABLE 10

| Input Language (IL) | Output Language (OL) | |
|---|---|---|
| ret → | save scratch registers %eax, %ebx and %eflags | |
|  | pop %eax | ; pop IL return address R |
|  | mov %ebx, %eax | ; copy R to % ebx |
|  | and %ebx, 63 | ; %ebx = R & 63 (hash function) |
|  | jmp (rtc_Base + c·%ebx) | ; jump to hinted target |

The final jump in the above code directs execution to a confirmation sequence, which is associated with the call site. The launch block provides the return address in %eax, so the sequence of instructions comprising the confirm block simply verifies that it has the "right" place (since the confirm block is associated with a call site, "R" is a constant value) as shown in Table 11, where the three instructions from push to jmp, inclusive, comprise the translated call and the instructions from cmp to restore, inclusive, comprise the confirm block proper.

TABLE 11

| IL | OL | |
|---|---|---|
| call P → | push R | ; push IL return address |
| R: | store (RTC), R' | ; set return target cache hint |
|  | jmp P' | ; jump to translated routine |
| R': | cmp %eax, R | ; return to right place? |
|  | jne Miss/Failure | ; jump to "back-up" code if wrong |
|  | restore %eax, %ebx, %eflags | |
|  | ... continue in translated code ... | |

Here, as is well known, "cmp" and "jne" are the x86 instructions for "compare" and "jump if not equal"; the other instructions are immediately obvious to those skilled in the art.

The mechanism described in the '672 patent has certain other details and preferred features such as initializing rtc[ ] so that all entries point to a miss handler, but the central idea is that a moderately sized array can be used to connect calls and returns. The IL instruction stream, and therefore the behavior-improving OL instruction stream that results from translation, will "carry" the value needed (the IL return address R) to hash into the array from procedure entry to return on its stack. The above instruction sequence is more compact than what would be possible using a shadow stack to carry OL return addresses.

Although an improvement over the prior art, the mechanism described in the '672 patent may not be optimal for every application. In particular, because it computes a hash of the return address, it requires a hash computation in the launch block. Moreover, it assumes the availability and use of two scratch registers (for example, %eax and %ebx), although this requirement may be relaxed in architectures other than the x86. Below, the term "mechanism for hashing return destination addresses" refers to the mechanism for returning from subroutines disclosed in the '672 patent.

Increasing the relative rate of hits is not the only important consideration when designing a system for implementing subroutine calls in the context of binary translation. In some binary translation implementations, for example, the capacity of the translation cache (TC) may be limited. In such systems, it is important to choose a translation for calls and returns that can be expressed using short OL instruction sequences to avoid using too much of the TC space. In each of the prior art systems mentioned above, the designer must therefore also try to ensure that the OL instruction sequences generated by the binary translator are chosen so as to optimize TC space usage. This optimization will depend on the given OL instruction set architecture.

What is needed is a system and a method that enables translation of calls and returns in a manner that a) overcomes the slowness of traditional mappings from IL to OL addresses; b) is less prone than inline caches to high miss rates; c) preferably generates less code so that less of the translation cache is needed; and d) permits a more efficient translation of calls than does a software implementation of a shadow stack.

In some applications, it will be faster or otherwise preferable to reduce the path length of the return mechanism, to avoid the need for a hash computation in the launch block, and perhaps to make do with single scratch register. It would therefore be good to have an alternate mechanism with these improvements, which still meets the needs a)-d) mentioned above. The present invention provides such a mechanism.

SUMMARY

One embodiment is a method for implementing subroutine calls and returns in a computer system. A component such as a binary translator converts a sequence of input language (IL) instructions, for example, issued by a guest software system, into a corresponding sequence of output language (OL) instructions of a host software or hardware system, which executes the OL instructions.

For each call to an IL subroutine made from an IL call site in the IL instruction sequence, the call's IL return address $R_{call}$ is stored on a stack; a first index is calculated by evaluating a function with P as an argument, where P is a procedure entry address of the subroutine; a corresponding correct OL return address R' is stored in a return target cache (RTC) at a location indicated by the first index; and an OL subroutine translation of the called IL subroutine is executed.

Upon completion of execution of the OL subroutine translation, instructions in a launch block are executed to retrieve an OL target address from the RTC at the location indicated by a second index, after which execution is continued beginning at the target address.

In the most common case, the OL target address will direct execution to a confirm block of instructions associated with a particular call site. The confirm block then determines whether an actual IL return address $R_{actual}$ fetched from the stack is the same as a predicted IL return address $R_{pred}$ embedded in the code of the confirm block. If the $R_{actual}$ is equal to $R_{pred}$, then a "hit" has occurred and execution may proceed as normal. If $R_{actual}$ is not equal to $R_{pred}$, then a "miss" has occurred and a back-up OL return address recovery module is invoked.

At least in computer systems based on the x86 architecture, only a single scratch register is needed in the launch and confirmation blocks of instructions.

The return target cache is preferably an array having a plurality of elements. The array may be initialized by storing in each of its elements a beginning address of the back-up return address recovery module.

The function from which the first index is calculated preferably maps IL procedure entry addresses substantially uniformly over the return target cache. As one example, where each of the elements of the return target cache is identified by an array index, the function extracts a number of bits from the address P. Calculation of the first index is preferably performed as part of the step of converting the IL call into the corresponding sequence of OL instructions.

A return success measure may be calculated as a function of the frequency of occurrence of hits relative to the frequency of occurrence of misses and the number of elements in the return target cache is adjusted according to a function of the return success measure.

A mechanism for binding a translation of a return within the OL subroutine translation to an index in the return target cache may also be provided. To trigger the binding, upon initial translation of each return, the launch block is made to use an RTC index that is dedicated to binding. Upon sensing the indication of lack of binding when addressing the return target cache using the dedicated index, the invention then provides for scanning the return target cache and associating with the current unbound launch block an array index other than the dedicated index.

DETAILED DESCRIPTION

In the context of binary translation of an IL stream to an OL instruction stream, the software mechanisms described herein provide a way to return very quickly and accurately from a called subroutine P. This ability to return accurately works to any level of nesting. This invention applies to all kinds of binary translators, both cross-platform and non-cross-platform binary translators, including the unrestricted binary translators that make no assumptions about the behavior of the translated program. However, while the presently described embodiments may be applied in the context of any binary translator, it provides the greatest benefits for the unrestricted class of binary translators.

General System Structure

Figure 4:
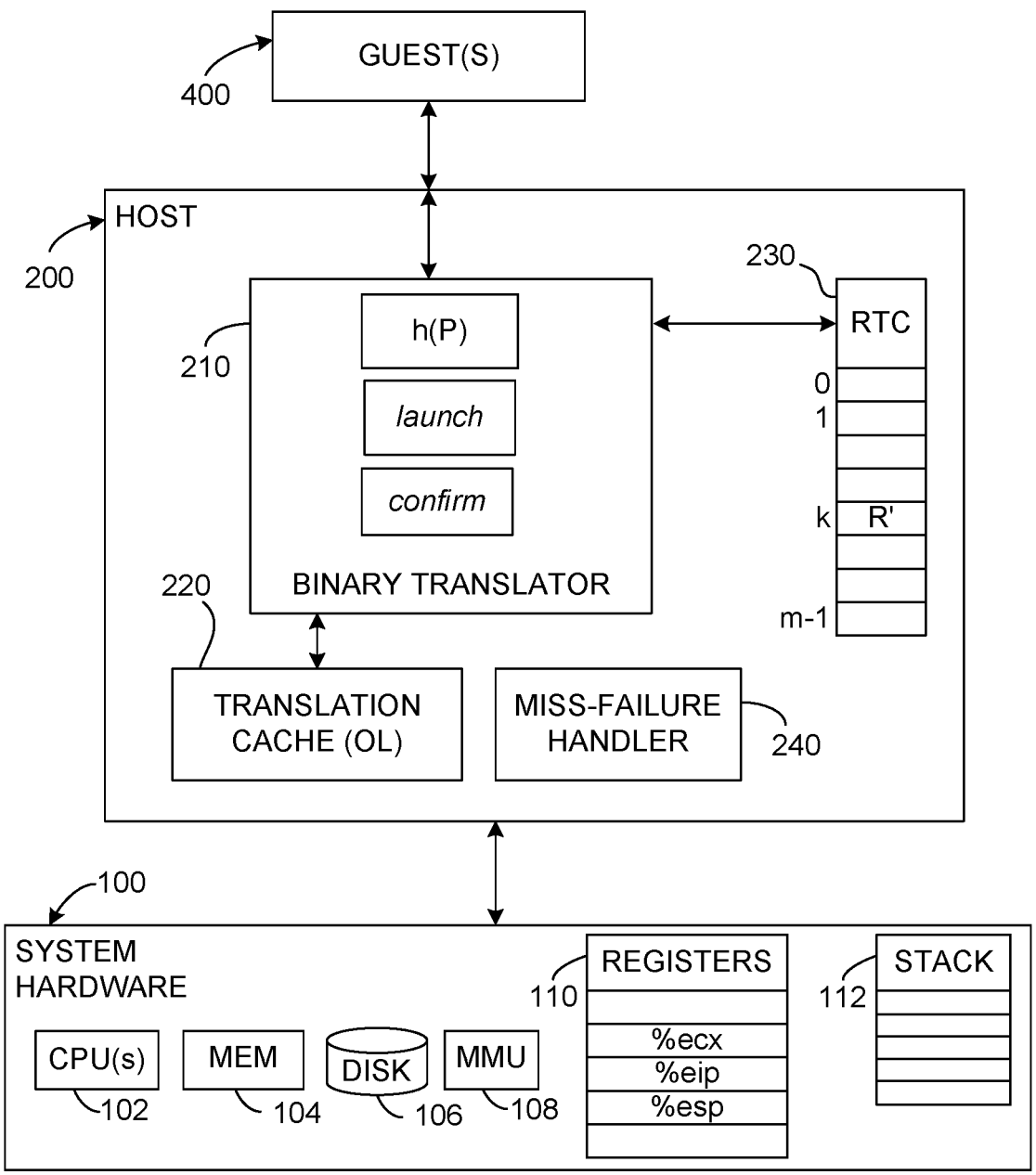
FIG. 4 shows the main hardware and software components of an exemplary system implementing subroutine calls and returns.

FIG. 4 shows the general structure of an exemplary system to implement subroutine calls and returns. A hardware platform 100 includes one or more processors (CPUs) 102, system memory 104, and a storage device, which will typically be a disk 106. The system memory will typically be some form of high-speed RAM, whereas the disk 106 (one or more) will typically be a non-volatile ("persistent") mass storage device. The hardware 100 will also include other conventional mechanisms such as a memory management unit MMU 108. Various devices (not shown) such as a display (monitor), keyboard, mouse, trackball, touchpad, etc., are usually also included in or attached to the hardware platform for obvious purposes.

The hardware platform will also include a number of registers 110, which may be included in other hardware components, especially the processor 102 itself. In FIG. 4, a general-purpose register is illustrated as %ecx. (Software registers, for example, dedicated memory locations, may also be used, although these will normally be slower.) At least one stack 112 is also included, and may be implemented in hardware or software; usually, but not necessarily, the stack is implemented as a portion of memory. As is well known, registers (or memory positions) are also included to hold a stack pointer %esp and an instruction pointer %eip (other architectures may use different names for analogous registers and may include more than one of each). Other features of the hardware platform will include such components as an arithmetic/logic unit (ALU); these are not shown because they are so well known and can be assumed to be present in any hardware platform the invention would be implemented on.

A software host 200 runs on the hardware platform 100. The host will include some form of operating system (OS)

(either a general-purpose OS and/or some specially designed kernel), which will include drivers as needed for various connected devices, as well as other well known conventional components. The OS and its standard components are not shown because they are so well known and may be assumed to be present, without reducing the ability of a skilled programmer to understand this invention. The host issues instructions in an output language (OL), which will typically be the instruction set of the hardware processor(s) 102.

One or more guest programs/systems 400 (which issue IL instructions for execution) are functionally connected via the host 200 system to run on the underlying hardware platform 100. Examples of the many types of guest programs that may use the invention range from a simple, conventional application program to a full-scale virtual machine (as in the products of VMware, Inc. of Palo Alto, Calif.) that includes its own virtual operating system, virtual memory, etc. It is assumed here that the guest is the component that issues an IL call to a subroutine P, which is translated into an equivalent OL instruction sequence that can run on the hardware platform.

Recall that the input and output languages may actually (but usually will not) be the same, or that one may be a subset of the other, but that binary translation between the guest and hardware is used in whole or in part for other reasons, such as to provide a virtualized platform for guests to run on. Moreover, it may not be necessary to have an actual, physical hardware system at all; rather, the guest (or, indeed, the host) may itself be running on a virtual machine or, for example, an emulation of the hardware platform, in which case the hardware platform 100 is a software construct.

The host system 200 includes a binary translator 210, which will typically be a software module, as well as a binary translation cache 220, which stores the output of the binary translator, that is, the IL-to-OL translated instructions. The host system also includes a return target cache RTC 230, which is discussed below. The general design and function of a binary translator and its connected translation cache are well known and are not described in detail below; of course, the specific improvements to the binary translator provided by this invention are.

In actual operation, all the illustrated software components will be sets of processor-executable instructions and related data either stored on the disk 106 or loaded in memory 104. They are shown as separate components by way of illustration only.

Actual, complete systems will contain many other hardware and software components that are well known. These are consequently not illustrated or described here since the invention does not depend on any particular implementation of these components. For example, as mentioned above the host system 200 will include, be connected to, function as, or replace the conventional host operating system found in most modern computers. In some implementations of the invention, for example, the guest 400 might be a virtual machine, in which case the binary translator and related components may be part of a virtual machine monitor that in turn is running on a host system software layer. The invention can be used in all such configurations.

Return Target Cache (RTC)

Figure 1:
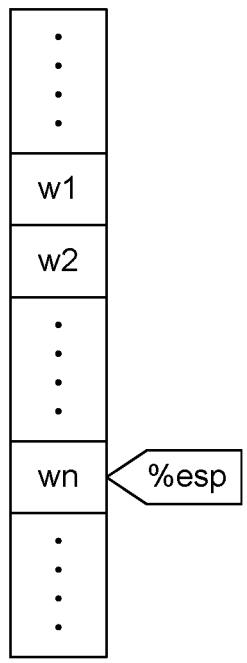
FIGS. 1-3 illustrate the contents of a stack and pointer before a subroutine call, after the call, and after the return from the subroutine.
Figure 2:
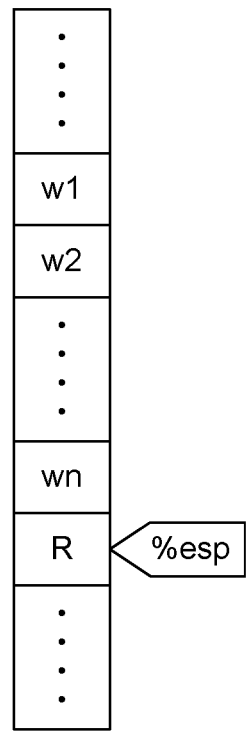
Figure 3:
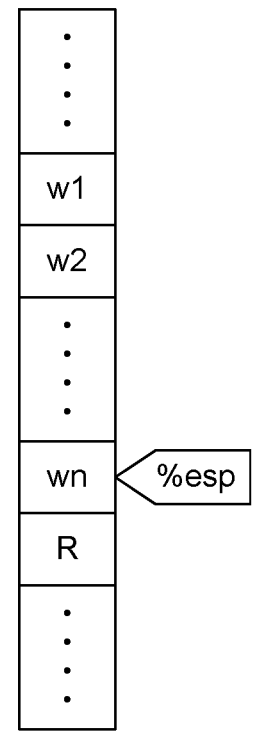
Figure 5:
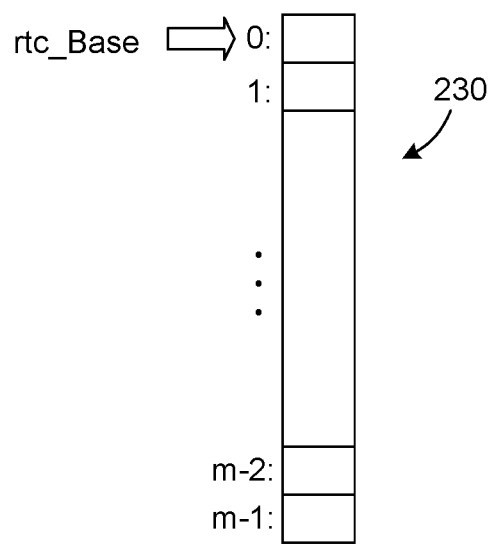
FIGS. 5 and 6 illustrate a return target cache used in the invention, with an OL return address shown in one cell in FIG. 6.
Figure 6:
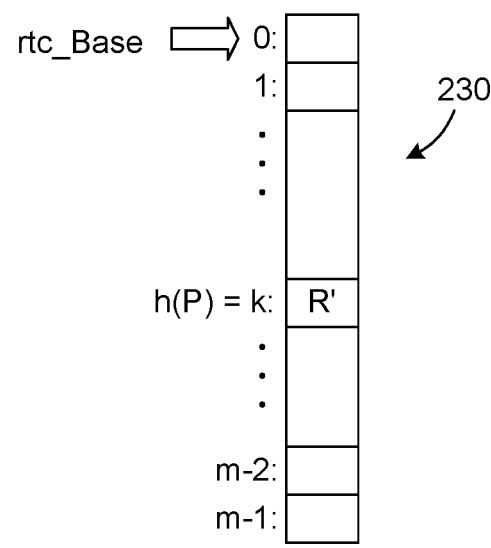

FIGS. 5 and 6 illustrate the structure of a return target cache 230, which is preferably implemented as a contiguous and relatively small array in memory. In particular, k is an index into the RTC and will typically be converted into a byte offset by multiplying by the size of the array elements in bytes for the low-level address computation. Such indexing is common in programming.

Of course, other data structures may also be used, although such structures will typically slow the invention down, because they will in general require more bookkeeping and complexity than a simple contiguous array. Moreover, it would also be possible to implement the return target cache using a dedicated hardware memory component, although this will in general also not be necessary, and would reduce the general applicability of the invention. Similarly, the size of the array may be chosen using normal design and experimental methods. The elements in the RTC array 230 will be OL addresses.

Returning from Subroutine

The translation mechanism according to the invention is similar to the one described in U.S. Pat. No. 6,711,672 (outlined above), but avoids the need to compute a hash of any address in the launch block (sequence of instructions); it also reduces the path length, in part by avoiding the need to hash and in part by making do with a single scratch register, here designated %ecx, to carry the return address from a launch block to a confirm code block. The assumption is that at least one call to a subroutine, whose entry address (or "call target address") is here designated as P, is made in the IL sequence. Below, referring to "subroutine P" is to be understood as meaning "the subroutine whose entry address is P."

To understand the new mechanism, assume the notation "%" as a prefix designates a register; "%esp" indicates the stack pointer register; "lea" is the "load effective address" instruction (opcode); "jecx" is the opcode for "jump if %ecx=0"; and destination operands are to the left of the comma in the representation of a multi-operand instruction.

Launch Block

Assume now that a call site that invokes procedure P is executed. As part of the invocation, the call site will push an IL return address $R_{call}$ onto the stack, which will typically be the address of the next executable instruction following the call to P. (Note that if a subroutine fails to include a guaranteed return, then failure to return is a flaw of the original IL subroutine itself and will be faithfully reproduced in the OL sequence.) Eventually, execution of P (including executing further, nested subroutine calls, which are handled in the same manner as the highest level call), will reach a return instruction, which the binary translator then translates into an OL launch block.

According to the invention, the launch block (sequence of instructions) used by the binary translator 210 saves the contents of a scratch register (for example, %ecx) for later restoration, pops an actual IL return address $R_{actual}$ from the stack into this register, then jumps to a target OL address R' indicated by the contents of a location k in the return target cache. Thus, using the same notation as above, see Table 12 below. How k is determined according to the invention is explained below.

TABLE 12

| launch: | save %ecx | ; save %ecx contents to fixed memory ; location (= mov M, %ecx) |
|---|---|---|
| | pop %ecx | ; fetch $R_{actual}$ (pull off stack into %ecx) |
| | lea %esp, imm(%esp) | ; optional instruction (see below) |
| | jmp rtc[k] | ; jump to address in rtc cell k |

In most cases, $R_{call}$ will be the same as $R_{actual}$. This is not guaranteed to be true, however, so the invention includes mechanisms (described below) to handle the cases in which this is false. The subscript "actual" is used here because it represents what is actually popped from the stack into %ecx.

Now consider each instruction of this launch block in turn:

Instruction "save %ecx": This well-known instruction in the OL return sequence saves the contents of scratch register %ecx so that the register can be used for performing the return. More specifically, because the return and "back-up" (the Miss/Failure handler described below) routines in this illustrative implementation use the register %ecx, the system needs to save its contents beforehand in order to be able to restore them, and thus restore the complete system state upon return.

Instruction "pop %ecx": This well-known, conventional stack operation fetches the information ($R_{actual}$) at the top of the stack into %ecx. Unless the code after the original subroutine call in some way modifies this information (for example, by some stack manipulation operations—see below) then the top of the stack should contain the IL return address $R_{call}$. As explained above, however, this cannot be assumed to be true. The system then automatically (as part of execution of the "pop" instruction) also updates the stack pointer. Regardless of what may have happened to the stack since the call site first pushed $R_{call}$ onto it, the "pop %ecx" instruction will place the current value of the stack in %ecx and treat it as the IL return address $R_{actual}$.

Instruction "lea %esp, imm(%esp)": Note that "lea" abbreviates "load effective address" and is a form of add instruction that does not modify flags. Instruction "lea x, ±n(y)" performs the operation x:=y±n. Whether this "lea" instruction should be included will depend on how parameters are handled in subroutine calls and returns.

In some languages, the number of parameters that a caller must pass to a subroutine must exactly match the number of parameters that the subroutine is declared to take. When translating such a subroutine, it is possible for the translated code in the subroutine to remove this known number of parameters in the stack before returning to the caller. In these cases, on x86 hardware, it is possible to implement this with a single return-with-immediate instruction. In the OL instruction sequence resulting from translating such a return, the "lea" instruction is used to accomplish this argument removal by setting %esp to point above the location of the argument(s).

In other languages, the number of parameters passed to a given subroutine need not be the same for all call sites. In compiling such languages, it is usually the caller's responsibility to remove arguments from the stack once the subroutine has returned. The subroutine will therefore terminate with a "plain" return-without-immediate instruction. The binary translation of such returns can omit the "lea" instruction since no additional stack pointer adjustment is necessary.

Instruction "jmp rtc[k]": This instruction as a whole performs a memory-indirect jump through the return target cache's cell at index k. As FIGS. 5 and 6 illustrate, k (or some multiple of k, depending on the architecture) will typically be added to a base address rtc_Base in order to identify the exact cell address, although this will depend on the particular hardware architecture and the data structure chosen to implement the RTC 230. In other words, execution is transferred to the address stored in the cell of the RTC entry located at index k.

"confirm block": Upon completed execution of the launch block, the following will apply: %ecx will contain the value $R_{actual}$ found at the top of the stack; and execution will proceed to the instruction whose address R' is located in cell k of the RTC 230. It is necessary for the system to determine, however, whether execution has, in fact, arrived at a point that corresponds to the proper OL return address.

The binary translator 210 according to the invention therefore inserts a block of code (instructions) referred to as the confirm block or sequence—preferably beginning at each return destination (here: R') in the OL instruction stream. This confirm block determines whether the return address that was found at rtc[k], and that was used for the return, is such that execution has returned to the right place in the OL instruction stream.

The confirm block follows logically as shown in Table 13 below from the launch block given above.

TABLE 13

| confirm: | lea %ecx, -$R_{pred}$ (% ecx) | ; %ecx:=%ecx-$R_{pred}$ |
|---|---|---|
| | jecx hit | ; jump to "hit" if %ecx contains 0 |
| | lea %ecx, $R_{pred}$ (%ecx) | ; reestablish actual IL return address in %ecx |
| | | ; by adding back $R_{pred}$ |
| | jmp miss | ; jump to conventional miss handler |
| hit: | load %ecx | ; restore %ecx original contents from a fixed |
| | | ; memory location (equivalent to mov %ecx,M) |

The first line of this code includes $R_{pred}$, which is a predicted IL return address. Note that each confirm block will normally be associated with some call site. Here it is assumed that the IL return address for this site is $R_{pred}$. In other words, within each confirm block is an embedded assumption that it has been called because of a jump through the RTC from a launch block that in turn was invoked because of a call site that has an IL return address $R_{pred}$. The jump to a given confirm block is thus a "prediction" about which call site is involved. Whether this prediction is true or not is the main purpose of the confirm block.

If $R_{pred}=R_{actual}$, then execution of the return is on the right path. A fast way to determine this is simply to subtract $R_{pred}$ from the contents of %ecx and see if the result is zero. If it is zero, then a "hit" has occurred, the register's original contents are restored, and execution continues normally with the OL instructions that follow the confirm block. If the result of the subtraction is non-zero, then any conventional miss handler (see below) must be invoked after the actual IL return address $R_{actual}$ has been recovered in %ecx by adding back the $R_{pred}$ that was earlier subtracted.

To summarize the main aspect of the mechanism illustrated above: A caller pushes a return address $R_{call}$ when calling a subroutine P. The launch block loads $R_{actual}$ into the scratch register %ecx and then jumps through the OL address R' found in rtc[k] to some confirm block (or to a default address as explained below). The confirm block compares $R_{actual}$, found in the scratch register %ecx, with the predicted IL return address $R_{pred}$ encoded within it (in particular, as one "lea" operand). If these values are equal, then execution may proceed as normal. If not, then the actual return address $R_{actual}$ is reestablished in %ecx and another mechanism must be invoked to attempt to find the proper return point.

The instructions "lea" and "jecx" avoid modifying and using (basing jumps on) flags and are used as an optimization specifically for x86 architectures. If the invention is implemented in some other architecture, then analogous instructions, which do not modify and/or test flags, should preferably be used. Of course instructions that do modify flags may also be used, although these will typically result in longer and slower OL instruction sequences since flags must be preserved across the launch and confirm blocks.

Value for "k": What remains to be determined is the value k, which is the index into the return target cache RTC used in the launch block. The value k cannot depend on the IL return address $R_{actual}$, since it is not constant at the return site—the procedure might have more than one caller, for example. According to the invention, k is therefore preferably computed as a function of the procedure entry address P. To see how this works, consider again the translation into the OL of the IL call to the procedure (subroutine) P as shown below in Table 14, where "rtc" is the return target cache, h( ) is a function described below, and, as before, an apostrophe indicates an address in the output language (translated) sequence. This translation constitutes a call block of instructions.

TABLE 14

| call P → | push R |
|---|---|
| R: | rtc[h(P)] := R' |
| | jmp P' |

As one optimization, the binary translator 210 preferably stores the code for P' immediately after this block of call instructions. The "jump" to P' will then simply be a continuation of execution with the next following instruction.

A fast but still adequate hash function h( ) may be as simple as extracting a certain number of bits b of P, for example, the lower b bits of P, which is equivalent to saying that h(P)=P mod m, where m=$2^b$. In one prototype of the invention, b=8, so that m=256, such that the lower byte of P was extracted and h(P)=k=P mod 256. Many other hash functions are known in the art, however. The hash function h( ) may be chosen from among these using normal design considerations. Note that the system can compute h(P) at compile time so a translated call is not slowed down by a need to calculate hash values; moreover, unlike in the '672 patent's mechanism, the hash value need not be computed as part of the launch block.

When the target of a call is not a constant, such as P above, as may occur with virtual methods in object-oriented programs and function pointers in C, the system cannot compute h(P)=k at compile time. Instead, the translator emits OL instructions to compute the RTC index dynamically from the given target. Such emitted instructions will be part of the translation of the call. This still avoids the need to compute a hash value in the launch block, however.

The term "hash function" is used here merely because using the lower order (or any other set of) bits of P as an index will usually provide a good distribution of indices over the RTC array 230, as is desirable for a hash function. One could also say that h( ) is a "bit extraction" or "mapping" function, or give this function some other name. The purpose would be the same, however. The term "hash function" is used because it is well known in the art and is general. The invention may use any function h of P whose range is preferably the same as (or smaller than) the range of indices of the RTC, that is, [0,m) where m is the length of the RTC array; to minimize the probability of "collisions," that is, two different procedure entry addresses hashing to the same value, the function h preferably maps P as uniformly as possible over the RTC index range.

Assume now that there is more than one call site. According to the invention, each call site will store its translated return target address R' into a cell in the rtc[k] that depends, not on the return address R, but rather on the address of the called procedure P. In the scheme disclosed in the '672 patent, callers scatter the OL return target addresses R' using the IL return addresses $R_{call}$. In the present invention, they scatter the OL return target addresses R' using the call target address P. To descramble the rtc[ ] at the return launch, it is necessary to find the procedure entry point for the return being translated. In other words, given a return, the system must determine which procedure it "belongs" to. Once the system determines the procedure P, it will also know the RTC index to use, since k=h(P).

Hit

Execution of the launch block transfers execution out of an OL procedure to a confirm block (or the miss handler) at address R'=rtc[k]. Commonly, the activated confirm block will be the one corresponding to the call site that invoked the procedure from which the launch block is returning. A "hit" is deemed to occur when the IL return address $R_{pred}$ embedded in the activated confirm block is the same as the actual return address $R_{actual}$ provided in %ecx by the launch block. This means that, after the "lea %ecx, -$R_{pred}$(%ecx)" instruction, %ecx will hold the value zero, so that the "jecx" hit instruction will cause a direct jump to the "load" %ecx instruction, which restores the contents of %ecx to whatever they were before the original return instruction was encountered.

Because of the return target cache and the nature of the hash function, a hit will be by far the most common case in the great majority of implementations and uses of the invention. In this case, execution may simply continue from R' as normal, with no further involvement of the special mechanisms provided by this invention, until the next subroutine call or return is encountered.

Miss

It is possible, however, that the OL return address R' will be overwritten by another call/return pair that executed inside the routine P. For example, within the instruction sequence P may be one or more calls to other subroutines, for example, Q, each causing calculation of a return address. Computation of the hash function might then cause one or more of these "nested" return addresses to be found at the same location in the return target cache as the higher-level OL return address R'. Upon return, execution will then transfer to the beginning of the confirm block for some OL call sequence (since each RTC entry except for default entries described below will point to "some" confirm block), but one that is incorrect. This case is referred to as a "miss."

By way of example, let $PR_{call}$ and PR' be the IL and OL return addresses, respectively, for a call to subroutine P and let $QR_{call}$ and QR' be the IL and OL return addresses, respectively, for a call to subroutine Q. Whenever P is called from this call site, $PR_{call}$ will be pushed onto the stack; similarly, whenever Q is called from this call site, $QR_{call}$ is pushed onto the stack. If, however, P calls Q and the hash function causes QR' to be stored at the same location in the return target cache as PR', in other words h(P)=h(Q), then upon return to the original call site, execution will transfer to QR', since this value will have overwritten PR' in the return target cache. In such a case, the return sequence would be directed to the wrong destination (the confirm block at QR' instead of the confirm block at PR').

In other words, a "miss" is when the predicted IL return address $R_{pred}$ is not the same as the actual return address $R_{actual}$ in %ecx, in short, an incorrect prediction. In this case, the "jecx" instruction will not jump. Execution falls through to the second lea instruction to recover $R_{actual}$ in %ecx before jumping to the miss handler described below.

Failure

One other possible return "error" (or "non-hit") is also possible: If a procedure directly manipulates the return address provided by its caller (e.g., by adding or subtracting from the value stored on the stack), then an attempt to return from the procedure, that is, to execute a launch block, may lead to a jump through an index in the rtc[.] that has never been set by a call site. This situation—which indicates that the RTC value did not provide any prediction at all—is referred to here as a "failure."

In order to avoid an attempt by the system to return to an undefined OL "address" and to branch to some undefined point in memory, the return target cache 230 is therefore preferably initialized by putting into each of the RTC array elements a default value, specifically, the address to the beginning of the Miss/Failure handler 240 described below. This initialization should also be done any other time the entries in the return target cache are invalidated. For example, certain events, such as address space mapping changes in a system-level binary translator, may require invalidation of the entries in the return target cache. Filling the return target cache with the default address of the Miss/Failure handler will cause the next few translated returns to execute the back-up sequence, but soon the return target cache will be filled with useful entries again, and execution will proceed at the faster speed provided by cache hits, that is, successful returns from the return target cache.

Miss/Failure Handler 240

The "back-up" code component, referred to here as the Miss/Failure handler 240, is the routine according to the invention that handles the cases in which the system determines either that the predicted IL return address $R_{pred}$ is not the same as the actual IL return address $R_{actual}$ (a miss) or that the fetched RTC value does not point to any confirm block at all (a failure).

The Miss/Failure routine may be any conventional method that maps the actual IL return address $R_{actual}$ to an OL return address R'. (Recall that the actual IL return address $R_{actual}$ is still available in %ecx when the "jmp miss" instruction in the confirm block invokes this routine.) For this "back-up" mapping, it can use any of several well-known data structures such as a conventional hash table. Since the back-up routine, that is, the Miss/Failure handler, executes only when the return target cache misses or fails—events which are relatively rare—even a costly hash table lookup may be used to perform the return. The back-up code will thus use this conventional hash table to compute the correct OL return target R', restore the scratch register %ecx, and finish with a jump to the correct OL return target R'. The slow back-up procedure used in this invention is thus the same as the only return procedure found in prior art systems—most of the time, however, the invention is able to use the return target cache and the much faster return procedure described above.

In very rare cases, it is possible that even a conventional hash table will not determine the correct OL return address R'. This problem is of course also encountered in the prior art systems that use the hash table-based return scheme. If this happens, it may be because there is no known OL return address that corresponds to the current value of %ecx—there is no way "back." In this case, as in prior art systems, the system according to the invention may perform a callout to the binary translator and cause it to translate the code starting at %ecx and onwards until some predetermined criterion is met.

Nested Calls

Assume again that the IL instruction sequence includes a call to P and a call to Q (which may be within P) such that the first call's return address is PR and the second call's return address is QR. Assume furthermore that P (Q) is well behaved so that when P (Q) returns, the actual return address is the address that was placed on the stack by P's (Q's) caller. The corresponding OL subroutines and return addresses are thus P', PR', Q' and QR'. To summarize the discussion above, after completing the call to P (P'), the memory indirect jump "jmp" rtc[k] of the return launch block is executed and there will be the following three possible actions:

1) a return to the correct beginning address PR' of the confirmation sequence following the correct subroutine call, in short, a "successful," correct return—a "hit"—that is, a correct prediction;

2) a return to the beginning address QR' of the confirmation sequence of the wrong subroutine—a "miss," which corresponds to an incorrect prediction—which will have happened because a later IL call target Q was converted by the hash function to the same the position in the return target cache and thus overwrote the correct (that is, earlier) entry PR'. This can also happen if the IL program changed the return address on the stack. In this case, the confirmation sequence will direct execution to the Miss/Failure handler; or 3) a jump directly to the Miss/Failure handler 240 in the case that the entry in the return target cache contains the initial, default address. Note that any other entry besides the default value will be the address to the beginning of the confirmation sequence of some translated subroutine, since the only time a non-default entry is stored in the return target cache is when the binary translator has translated an IL subroutine call and has generated code that puts its translated return address, that is, its confirm block address R' sequence, into the return target cache.

Figure 7:
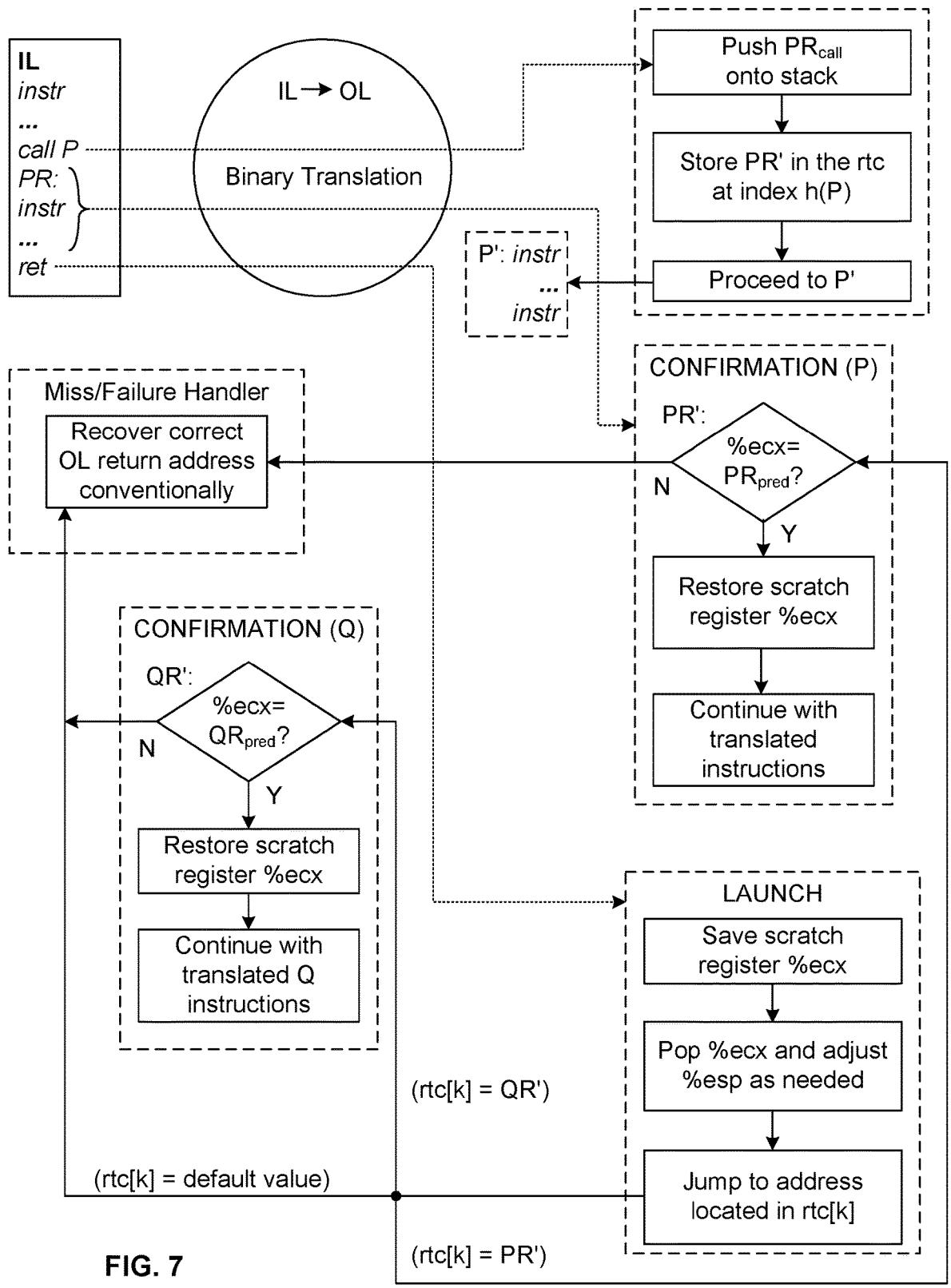
FIG. 7 is a flowchart that shows the main processing steps carried out according to an exemplary procedure for quickly and accurately branching to and returning from subroutines.

FIG. 7 is a flowchart that illustrates the binary translation of the IL instruction sequence into the OL sequence, which is stored in the binary translation cache. In FIG. 7, the IL instruction sequence is shown within a box with a solid border; all other instruction blocks are in the OL sequence. Arbitrary IL instructions, and their OL translations, are shown simply as "instr." FIG. 7 also illustrates the three possibilities for returning after completion of a call to the IL subroutine P, which is translated into an equivalent OL subroutine P'.

Locality

The reason why the return target cache achieves a high hit rate is that, at any given time, it will tend to contain return target addresses for the most recently executed calls. These are the calls that are likely to return in the near future. In other words, the return target cache exploits a locality phenomenon: the depth fluctuations on the return stack as calls and returns execute are relatively modest in most programs. This allows a small return target cache to capture the active calls and returns with a high probability.

Alternative Embodiments and Optimizations

Above is described the preferred embodiment of the invention, for using the return target cache upon translation of calls and returns. There are, however, alternatives. For example, in one variation, the code—the confirm block—shown above at the translated call site to confirm the correctness of the return target addresses may be moved in whole or in part to the return site. This would necessitate slight changes, which skilled programmers will realize and be able to implement. Moreover, as an optimization, the confirm block is preferably emitted so as to be located immediately after the launch block when the return is translated; this improves both instruction cache and branch performance.

Other variations might involve reorganizing the return code to enable multiple return sites to share some of the code. This would provide a code space savings, but would not change the fundamental idea of the invention. The method according to the invention may also be generalized to handle other forms of returns, such as far returns; necessary changes to the steps described above will be obvious to those skilled in the art.

Comparison with the Mechanism for Hashing Return Destination Addresses

In the Background section above, the mechanism for returning from subroutines disclosed in U.S. Pat. No. 6,711,672 is summarized using the instruction sequences used in that application itself. The essential mechanism disclosed in the '672 patent (hashing IL return destination addresses) can be expressed using instructions similar to those used above to describe the present invention. This way of expressing the mechanism for hashing return destination addresses allows for more direct and revealing comparison between the system described in the '672 patent and the present invention. Moreover, the expression of the '672 patent's scheme below has the added advantage (compared with how it is written in the '672 patent) that it does not affect flags.

The launch and confirm blocks in the '672 patent can be expressed as shown below in Table 15 and Table 16, where %eax, %ecx are separate scratch registers. Here, merely for the sake of compatibility with the use of movzx for hashing, it is assumed that the RTC has 256 entries instead of the 64 used by way of example in the '672 patent.

TABLE 15

| ret → launch: | save %eax | |
| | save %ecx | |
| | pop %eax | ; fetch $R_{actual}$ |
| | lea %asp, imm(%esp) | ; optional (see above) |
| | movzx %ecx, %al | ; h($R_{actual}$) |
| | jmp rtc[%ecx] | |

The instruction "movzx" is the "move with zero-extend" opcode and the entire instruction creates in %ecx a 32-bit data word from the lower byte ($2^8$=256 possible values) of %eax (%al is the lowest byte of the extended accumulator register %eax). Of course, the hash calculation may be performed using other opcodes, for example in architectures with other instruction sets, but if more than one instruction is needed the result will typically be less efficient.

The instruction "jmp" is the conventional "jump" opcode.

Note that this launch block includes the "movzx %ecx, %al" instruction, which replaces the "and %ebx, 63" instruction shown in the example code listing for the '672 patent found above. In either case, the mechanism in the '672 patent therefore requires a recomputation of the hash function in the launch block, as represented in Table 16, where "jecx" is an instruction to skip to hit if %ecx=0.

TABLE 16

| confirm: | lea %ecx, - $R_{pred}$ (%eax) |
| | jecx hit |
| | jmp miss |
| hit: | load %eax |
| | load %ecx |

If the address in %eax matches $R_{pred}$, then "lea" will set %ecx to zero and "jecx" will cause a skip, over the "jmp" instruction, to the instructions to be executed for a hit. If they do not match, then execution will proceed to the following instruction, that is, to "jmp miss", which causes a branch to the miss-handling routine.

The key difference between the present invention and the invention described in the '672 patent is that, in the present invention, there is no need to compute the hash function dynamically in the launch block. In contrast, in the '672 patent, code must be emitted to pull $R_{actual}$ from the stack and perform the hash computation.

Another difference is that the launch block according to the present invention has one fewer scratch register save. Moreover, the confirm block in this invention has fewer executed instructions on the common path. Together the launch and confirm blocks can be implemented (in x86, at least) so as to use only a scratch register. Note that this difference may be negated in certain architectures, although it will in general be present in x86 systems.

Binding

To maximize the hit rate, the mapping from return instruction to procedure entry should be as precise as possible. The miss rate will then be determined by the "random" collisions in the RTC; these should be few, however, since stacks rarely move up or down by more than a few frames. Assuming an unambiguous mapping, the mechanism according to the invention should be approximately as efficient as the scheme based on hashing return addresses R instead of P.

On the other hand, in the scheme disclosed in the '672 patent, computation of the RTC index k was entirely dynamic in the launch block. In this invention, however, the RTC may assume a static role as well: it supports binding of launch blocks to RTC indices k.

A given launch block may be "unbound," that is, not yet associated with a valid return address. Another way to state this is that the RTC index k calculated initially from the function h(P) might not be the same as the RTC index later used when the system tries to retrieve the OL return target address R' from the RTC. Upon a return, some mechanism should therefore preferably be included to find the corresponding procedure entry. In other words, there should preferably be some way to bind the unbound launch block. Such a binding function should preferably maximize the probability that the two indices are the same.

One way to accomplish this is to include in the system an auxiliary data structure that records procedure entry points. The binary translator will add to this data structure when processing call instructions. Return translations will then look in the data structure to find, say, the nearest preceding procedure entry point.

An entirely different approach is to use the rtc[ ] itself for this computation. According to this scheme, initially, when a return is translated, a special index, for example, 256 (or any other index outside the range of the hash function h( ), is assigned for the purpose and the value stored in rtc[256] is some value that causes the "jmp" instruction to generate a fault or in some other way indicate that the launch block is unbound. In x86 architectures, this value could, for example, be the binary value for −1, which in some cases (known to skilled programmers) can be used to generate a General Protection (GP) fault. Regardless of what value is used to lead to the fault or indication, when the system detects this condition, it scans rtc[0 . . . 255] to try to find a suitable index k to use in place of 256. For each cell rtc[.], the system then determines the return EIP (extended instruction pointer) that the cell services.

Two different situations may occur: (1) the cell may point to the miss handler, in which case this cell cannot be used; and (2) the cell may point to a confirm block, in which case the system can extract the EIP from one of the "lea" instructions in the block, which can be readily found given the confirm block's entry address.

To bind a launch block, the system can scan the RTC entries (at most, for example, 256 entries). With a high probability, it will find an index k that points to a confirm block whose IL address $R_{pred}$ matches the actual IL return address $R_{actual}$. If such a k is found, then the launch block's jump is patched to use k, e.g., "jmp rtc[k]". If no suitable k value is found, then the system can try again one or more times, for example, the next time(s) the given launch block is executed. After a predetermined number of failing tries, the system can route the return directly to the miss handler, which should happen only rarely.

The launch block will be unbound until k is computed. The value k may be computed and patched in by the fault handler the first time the launch block is executed.

If the RTC according to the invention is used to implement binding, RTC entries should not be lost unnecessarily, as this could prevent binding of important return sites and lead to costly invocations of the conventional miss handler. A failure to accurately bind even a single launch block could cause an unbounded number of miss handler executions. In any binary translator that implements the invention, the system designer should therefore examine carefully all code sections that cause a flush of the RTC.

Dynamic RTC Array Adjustment

One factor that affects the efficiency of the system according to the invention is the frequency of misses, since it takes a relatively long time to determine the correct OL return address in the Miss/Failure handler. A high miss rate might arise, for example, because of an IL program with many deeply nested subroutines.

The system according to the invention may therefore also include a mechanism that dynamically adapts the size of the RTC 230 to current needs. Using this adaptation mechanism, if the miss rate exceeds some experimentally or arbitrarily determined expansion threshold, then the system will often be able to reduce the likelihood of misses by increasing the size of the RTC. In addition to increasing the memory allocation for the RTC array 230, the function h( ) should then be adjusted accordingly. For example, assuming that h(P)=P mod m, and if the array is increased from 256 to 512 elements, then the parameter m should also be changed from 256 to 512 in order to extract the nine least significant bits of the IL return address instead of only eight. An appropriate time to resize the RTC will be immediately after a flush of the translation cache.

Of course, the problem is how to calculate the miss rate. One way is to include incrementing instructions in the Miss/Failure handler to count misses. The miss rate can then be defined as the number of misses that have occurred during some predetermined interval. One problem with this approach, however, is that a very high rate of subroutine calls might lead to a high miss count, even though the ratio of misses to total calls is acceptable.

It would therefore be better to adjust the RTC size based on the relative frequency of misses (for example, the ratio of misses to total calls, or the ratio of misses to hits) rather than on the absolute number of misses in a given interval. In doing so, one should avoid including any additional instructions in the launch and confirm blocks, because these blocks will usually be executed so often that the time needed to execute the additional instructions will in almost all cases be more than the time saved by implementing the dynamic RTC array adjustment feature.

One way to determine the relative miss rate, and to adjust the RTC size accordingly, is to use a sampling technique. First, note that the system can determine, for any given value of the instruction pointer, whether execution is currently in the launch block, in a confirmation block, or in the Miss/Failure handler. A module can therefore be included within the binary translator, or elsewhere in the host system, to periodically interrupt execution of the OL instructions and determine whether execution is in a confirm block (indicating a hit or miss), in the Miss/Failure handler (indicating a miss or failure) and/or in the launch block (indicating some return).

Let M be the number of times execution is found to be in the Miss/Failure handler; C be the number of times execution is found to be in a confirmation block; and L be the number of times execution is found to be in the launch block. The quotient M/C will then be a reasonable estimate of the ratio of misses to total non-failure returns. (Note that adjusting the size of the RTC array will usually not affect the rate of failures.) Similarly, the quotient M/L will be a reasonable estimate of the ratio of misses to total returns, including failures. Either M/C or M/L can therefore be used as the miss rate and compared with the expansion and contraction thresholds. As skilled programmers will realize, all such quotients may need to be scaled to account for differences in the execution times of the different components.

Tail Calls

There is one case where the new scheme according to the invention is inferior to the mechanism for hashing based on return addresses, namely, a situation known in the art as a tail call. If a procedure P is called in the normal way, the system will map its return to the index calculated from "P." If P is later invoked with a tail call from some other procedure Q, however, the system will probably miss on the return since it should jump through rtc[h(Q)] instead of rtc[h(P)]. Assuming the conventional miss handler (which implements the back-up path) is relatively fast, this is not a serious shortcoming of the invention. Furthermore, tests run by the inventor indicate that misses of this type do not occur so often that they offset the performance gains won through the invention.

What is claimed is:

1. A computer system comprising a host, the computer system comprising:
    a memory comprising a return target cache implemented as an array having a size that is dynamically adjustable; and
    one or more processors coupled to the memory, the one or more processors being configured to:
        execute instructions in an output language (OL);
        run a guest, the guest configured to issue a sequence of instructions in an input language (IL);
        dynamically adjust the size of the return target cache; and run a binary translator configured to convert the sequence of IL instructions of the guest into a corresponding sequence of OL instructions of the host, wherein the binary translator converts a first sequence of IL instructions of the guest including a call statement that directs execution to a subroutine having an IL procedure entry address P and an IL return address R, into a first sequence of OL instructions of the host by: (i) translating the call statement into a call block of instructions, the call block pushing the IL return address R onto a stack and storing a known OL return address corresponding to the IL return address R in the return target cache at a location corresponding to a value derived from the IL procedure entry address P, and (ii) inserting a confirm block of instructions at an address following the call block, the confirm block determining a hit if an address popped from the stack matches the IL return address R, wherein the one or more processors, responsive to the confirm block determining the hit during execution of the first sequence of OL instructions, retrieve the known OL return address from the return target cache at the location corresponding to the value derived from the IL procedure entry address P and continue execution of the first sequence of OL instructions at the retrieved known OL return address.

2. The computer system of claim 1, wherein the binary translator is configured to convert each of one or more other N sequences of IL instructions of the guest including a call statement that directs execution to a subroutine having an IL procedure entry address Pn and an IL return address Rn (where n=1, 2, . . . , N), into a corresponding sequence of OL instructions of the host.

3. The computer system of claim 2, wherein the confirm block determines a miss if the address popped from the stack does not match the IL return address R or any of the other IL return addresses Rn (where n=1, 2, . . . , N), and responsive to the confirm block determining the miss, executes a miss/failure handler to recover a correct OL return address.

4. The computer system of claim 3, wherein the one or more processors are configured to track a number of times the miss/failure handler executes during execution of OL instructions converted from IL instructions of the guest, and adjust the size of the return target cache based on said number of times.

5. The computer system of claim 4, wherein the one or more processors are configured to adjust the size of the return target cache based on the number of times the miss/failure handler executes during the execution of the OL instructions converted from IL instructions of the quest over a predetermined period of time.

6. The computer system of claim 4, wherein the one or more processors are configured to adjust the size of the return target cache based on the number of times the miss/failure handler executes during the execution of the OL instructions converted from IL instructions of the quest over a predetermined period of time, divided by a total number of subroutine calls made during the execution of the OL instructions converted from IL instructions of the quest.

7. A method for implementing subroutine calls and returns in a computer system having a host configured to execute instructions in an output language (OL), a guest communicatively coupled to the host and configured to issue a sequence of instructions in an input language (IL), a return target cache implemented as an array having a size that is dynamically adjusted, and a binary translator configured to convert the sequence of IL instructions of the guest into a corresponding sequence of OL instructions of the host, said method comprising:

converting a first sequence of IL instructions of the guest including a call statement that directs execution to a subroutine having an IL procedure entry address P and an IL return address R, into a first sequence of OL instructions of the host by: (i) translating the call statement into a call block of instructions, the call block pushing the IL return address R onto a stack and storing a known OL return address corresponding to the IL return address R in the return target cache at a location corresponding to a value derived from the IL procedure entry address P, and (ii) inserting a confirm block of instructions at an address following the call block, the confirm block determining a hit if an address popped from the stack matches the IL return address R; and responsive to the confirm block determining the hit during execution of the first sequence of OL instructions, retrieving the known OL return address from the return target cache at the location corresponding to the value derived from the IL procedure entry address P and continuing execution of the first sequence of OL instructions at the retrieved known OL return address.

8. The method of claim 7, further comprising:

converting each of one or more other N sequences of IL instructions of the guest including a call statement that directs execution to a subroutine having an IL procedure entry address Pn and an IL return address Rn (where n=1, 2, . . . , N), into a corresponding sequence of OL instructions of the host.

9. The method of claim 8, wherein the confirm block determines a miss if the address popped from the stack does not match the IL return address R or any of the other IL return addresses Rn (where n=1, 2, . . . , N), and responsive to the confirm block determining the miss, executes a miss/failure handler to recover a correct OL return address.

10. The method of claim 9, further comprising:

tracking a number of times the host executes the miss/failure handler during execution of OL instructions converted from IL instructions of the guest; and adjusting the size of the return target cache based on said number of times.

11. The method of claim 10, wherein the size of the return target cache is adjusted based on the number of times the host executes the miss/failure handler during the execution of the OL instructions converted from IL instructions of the quest over a predetermined period of time.

12. The method of claim 10, wherein the size of the return target cache is adjusted based on the number of times the host executes the miss/failure handler during the execution of the OL instructions converted from IL instructions of the quest over a predetermined period at time, divided by a total number of subroutine calls made during the execution of the OL instructions converted from IL instructions of the quest.

13. A non-transitory computer readable medium embodying program instructions for implementing subroutine calls and returns in a computer system having a host configured to execute instructions in an output language (OL), a guest communicatively coupled to the host and configured to issue a sequence of instructions in an input language (IL), a return target cache implemented as an array having a size that is dynamically adjusted, and a binary translator configured to convert the sequence of IL instructions of the guest into a corresponding sequence of OL instructions of the host, the program instructions causing the computer system to perform a method comprising the steps of:

converting a first sequence of IL instructions of the guest including a call statement that directs execution to a subroutine having an IL procedure entry address P and an IL return address R, into a first sequence of OL instructions of the host by: (i) translating the call statement into a call block of instructions, the call block pushing the IL return address R onto a stack and storing a known OL return address corresponding to the IL return address R in the return target cache at a location corresponding to a value derived from the IL procedure entry address P, and (ii) inserting a confirm block of instructions at an address following the call block, the confirm block determining a hit if an address popped from the stack matches the IL return address R; and responsive to the confirm block determining the hit during execution of the first sequence of OL instructions, retrieving the known OL return address from the return target cache at the location corresponding to the value derived from the IL procedure entry address P and continuing execution of the first sequence of OL instructions at the retrieved known OL return address.

14. The non-transitory computer readable medium of claim 13, wherein the method further comprises the step of:

converting each of one or more other N sequences of IL instructions of the guest including a call statement that directs execution to a subroutine having an IL procedure entry address Pn and an IL return address Rn (where n=1, 2, . . . , N), into a corresponding sequence of OL instructions of the host.

15. The non-transitory computer readable medium of claim 14, wherein the confirm block determines a miss if the address popped from the stack does not match the IL return address R or any of the other IL return addresses Rn (where n=1, 2, . . . , N), and responsive to the confirm block determining the miss, executes a miss/failure handler to recover a correct OL return address.

16. The non-transitory computer readable medium of claim 15, wherein the method further comprises the steps of:

tracking a number of times the host executes the miss/failure handler during execution of OL instructions converted from IL instructions of the guest; and adjusting the size of the return target cache based on said number of times.

17. The non-transitory computer readable medium of claim 16, wherein the size of the return target cache is adjusted based on the number of times the host executes the miss/failure handler during the execution of the OL instructions converted from IL instructions of the quest over a predetermined period of time.

18. The non-transitory computer readable medium of claim 16, wherein the size of the return target cache is adjusted based on the number of times the host executes the miss/failure handler during the execution of the OL instructions converted from IL instructions of the quest over a predetermined period of time, divided by a total number of subroutine calls made during the execution of the OL instructions converted from IL instructions of the quest.

* * * * *